March 30, 1948.  R. GROETCHEN  2,438,699
COOKER
Filed Nov. 29, 1943  2 Sheets-Sheet 1

INVENTOR.
Richard Groetchen
BY
His Attorney

March 30, 1948. R. GROETCHEN 2,438,699
COOKER
Filed Nov. 29, 1943 2 Sheets-Sheet 2
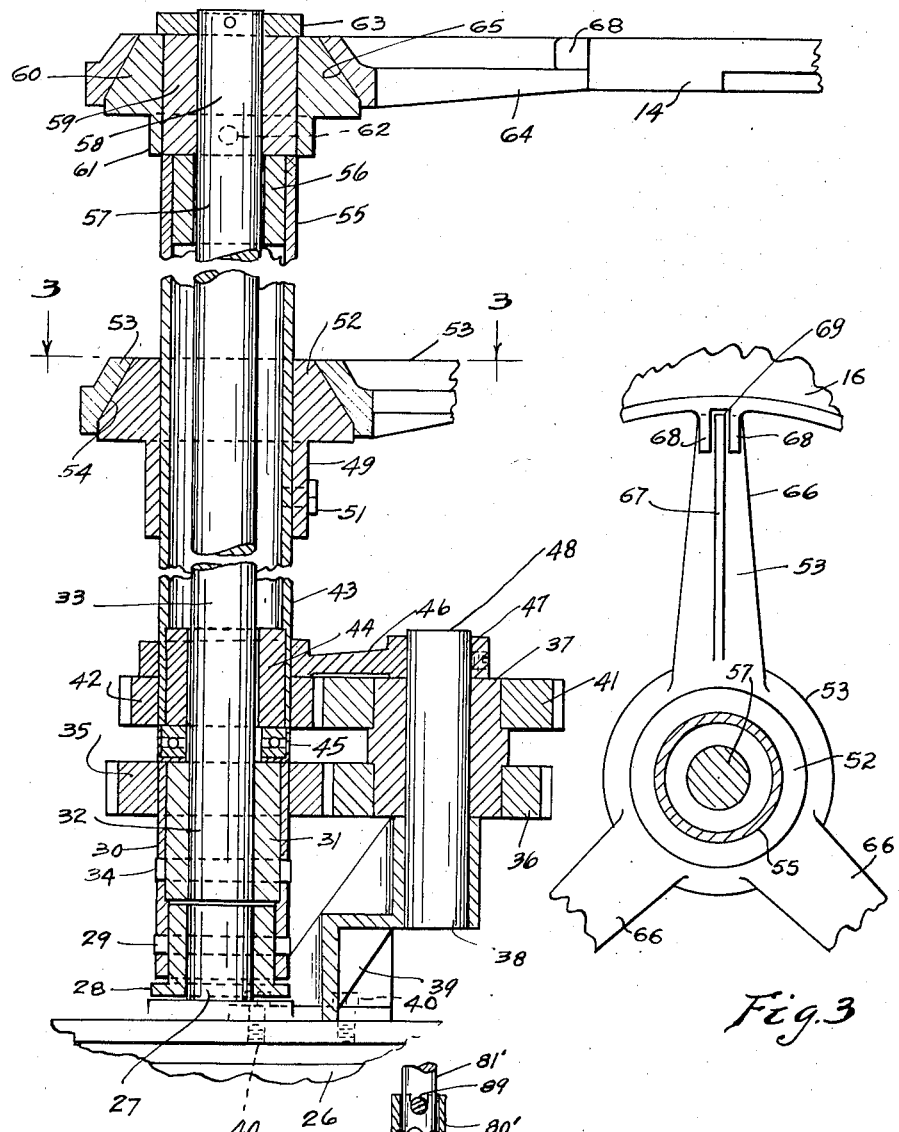
Fig.2
Fig.3
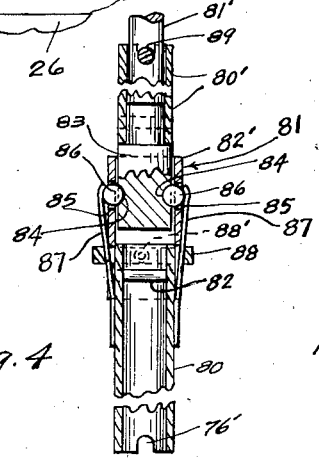
Fig.4
INVENTOR.
Richard Groetchen
BY
His Attorney.

Patented Mar. 30, 1948

2,438,699

UNITED STATES PATENT OFFICE 2,438,699

COOKER

Richard Groetchen, Chicago, Ill.

Application November 29, 1943, Serial No. 512,156

1 Claim. (Cl. 99—427)

This invention relates to certain novel improvements in cookers and has for its principal object the provision of an improved construction of this character which will be highly efficient in use and economical in manufacture.

The present invention constitutes an improvement over that shown in my pending application, Serial No. 451,263, filed July 17, 1942, now Patent No. 2,375,412.

The present invention has for its salient object the provision of a cooker having an enclosure divided into a plurality of chambers by grid plates, certain of which are supported within the enclosure for manual rotation, while the remaining grid plates are mechanically rotated by means including a structure functioning to rotate one of the remaining grid plates at a speed of rotation different from the speed of rotation of the other of the remaining grid plates, whereby the length of time that foodstuff is to be subjected to cooking or broiling operation may be governed by the operator of the cooker. In other words, should the operator desire to subject the foodstuff to a longer cooking operation, he will place the foodstuff on the rotatable grid plate which travels the slowest; on the other hand, should he desire a shorter period of cooking operation for the foodstuff, in that case the foodstuff will then be placed upon the grid plate which operates at a faster speed of rotation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 2 is a fragmentary sectional detail view of the grid plate rotating means embodied in the invention, taken substantially on line 2—2 of Fig. 1;

Fig. 3 is a fragmentary sectional detail view of the same taken substantially on line 3—3 of Fig. 2; and Fig. 4 is a sectional detail view of a slip joint embodied in the invention.

Figure 1:
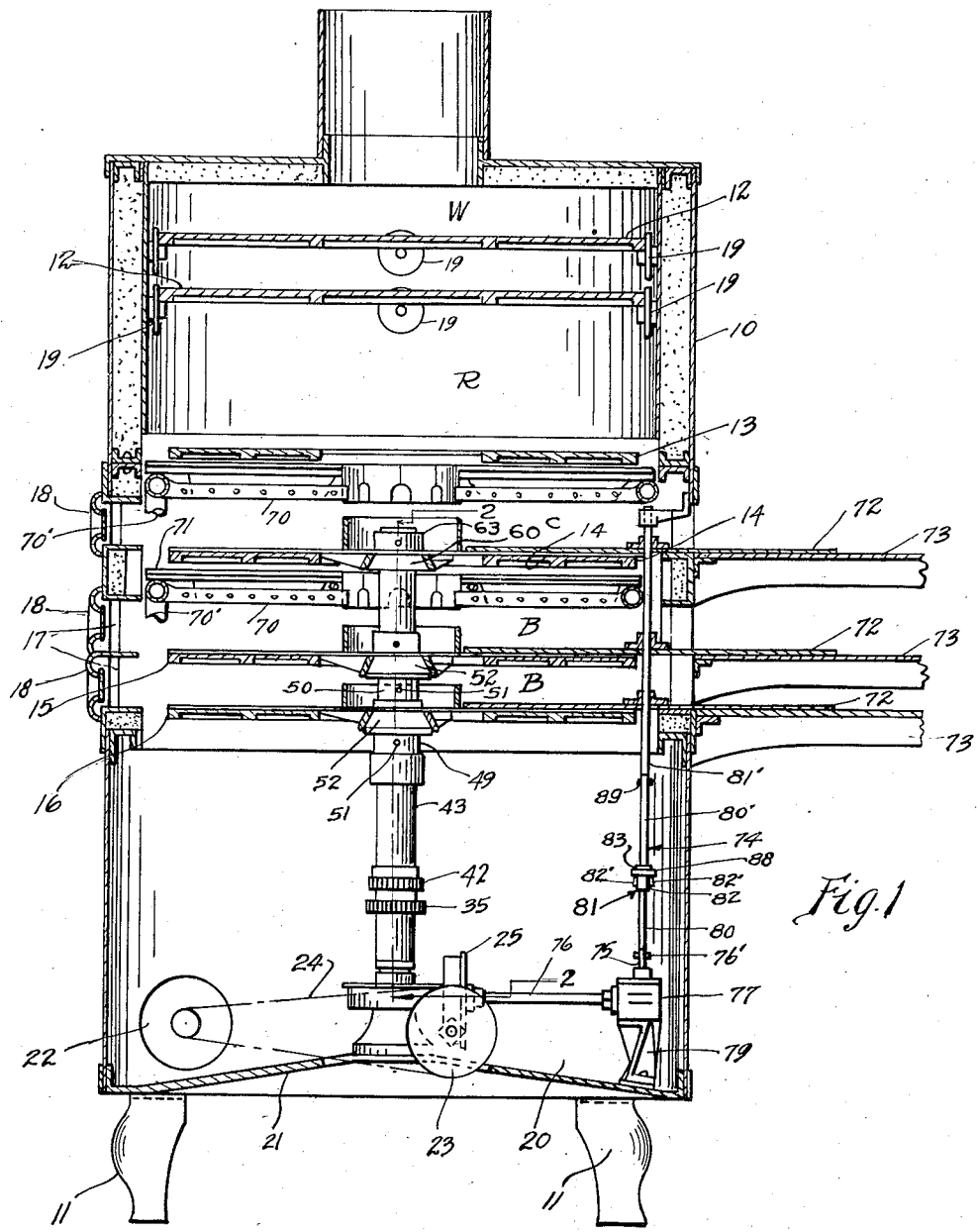
Fig. 1 is a vertical sectional detail view of a cooker embodying my invention.

The drawings illustrate the preferred form of construction by which the several objects of my invention are accomplished. The cooker illustrated in Fig. 1 of the drawing is substantially similar to that shown in my co-pending application hereinbefore mentioned, except as hereinafter set forth. Only such reference to this cooker will be made as is necessary to a complete understanding of the present invention.

In this respect my cooker includes an enclosure 10 supported by suitable feet 11. Within the upper portion of this enclosure are arranged grid plates 12, 13, 14, 15 and 16, each spaced substantially from each other and dividing the enclosure 10 into compartments, W as a warming compartment, R as a roasting compartment, C as a cooking compartment, and B as a broiling compartment. To the compartments W and R access may be had through a suitable door opening normally closed by a door (not shown). Access to the compartments C and B is had through the door openings 17 normally closed by suitable doors 18.

The grid plates 12 are mounted upon rollers 19 in a manner such that they may be manually rotated. The grid plate 13 is stationary, while the grid plates 14, 15 and 16 are rotated mechanically in a manner now to be described.

The lower portion of the enclosure 10 provides a utility chamber 20 having a bottom wall 21. On this bottom wall 21 is mounted a motor 22. This motor 22 is operatively connected to a driven wheel 23 by means of a belt 24. This wheel 24 has operative connection to a train of gears (not shown) arranged in gear housings 25 and 26. Projected from the gear housing 26 is a stud shaft 27. This stud shaft 27 is surrounded by a suitable bearing sleeve 28. Projected through this sleeve 28 and the stud shaft 27 is a pin 29. A tube 30 is provided and this tube 30 has arranged therein a bushing 31. Projecting into this bushing 31 is the end portion 32 of a shaft 33. The shaft 33 and bushing 31 are keyed to the tube 30 by a transversely extending pin 34. On this tube 30 is fixedly secured in any suitable manner a gear 35. This gear 35 meshes with a gear 36. The gear 36 is carried by a collar 37 rotatably mounted upon a stud shaft 38. This stud shaft 38 is supported by a bracket 39 connected to the top of the gear housing 26 as at 40. Mounted on this collar 37 and rotatable therewith is a gear 41 operatively meshing with a gear 42. This gear 42 is fixedly secured in any suitable manner to a hollow column or tube 43 through which the shaft 33 extends. In the lower end portion of the column 43 is a bushing 44, and between the bushing 44 and the bushing 31 is an anti-friction bearing 45 of any approved and well-known type.

Extending from the column 43 is an arm 46, the end 47 of which embraces the end 48 of the stud shaft 38, whereby to stabilize and hold firm the stud shaft 38. Mounted on the column 43 are collars 49 and 50. These collars 49 and 50 are secured to the column for rotation therewith by set screws 51. The upper end portion of these collars are formed substantially conical shaped as at 52. The grid plates 15 and 16 each have a hub 53 formed with a conical shaped socket 54 corresponding to the conical shaped head 52 of each of the collars 49 and 50 and adapted to receive the heads 52 whereby to support the hubs 53 in the manner shown.

Disposed in the upper end portion 55 of the column 43 is a bushing 56 through which the upper end portion 57 of the shaft 33 projects. The exterior end portion 58 of this shaft 33 has a bushing 59 mounted thereon and on this bushing 59 is mounted a conical shaped head 60. This head 60 is formed as an integral part of a collar 61 which collar, together with the bushing 59, is keyed to the shaft 33 by a key 62. On the end portion 58 of the shaft 33 is fixed a collar 63. The grid 14, like the grids 15 and 16, includes a hub 64, and this hub has a conical shaped socket 65 corresponding to and adapted to receive the conical shaped head 60 of the collar 61.

The hubs 53 and 64 are preferably spider shape in formation, providing the lateral arms 66 having the upstanding longitudinal rib 67. The grid plates are each provided with spaced ribs 68 between which the end of the rib 69 of the rib 67 is projected.

As shown in Fig. 1, there is confined within the enclosure 10, burner structures 70 including covers 71, the latter being formed of ceramic material. These burner structures are substantially identical with that disclosed in my companion application filed on date hereof.

As in my copending application previously mentioned, the foodstuff is rotated from the grids 14, 15 and 16 upon rotatable delivery discs 72 and thence upon suitable platforms 73, from whence they are taken for serving purposes. These plates 72, as in my pending application, are mechanically rotated through the mechanism indicated at 74, including a shaft 75 operatively connected to a driven shaft 76 through the medium of a gear assembly (not shown) arranged in the housing 77. The housing 77 is supported by a suitable bracket 79 (Fig. 1) mounted on the wall 21. This shaft 76 projects from the gear housing 25 and is driven by the gear assembly (not shown) contained within the gear housing 25 (Fig. 1). The shaft 76 has a slot and pin connection 76', of standard construction, with a shaft 80.

To the burners 70, fuel in the form of gas is conducted by supply conduits 70' preferably under forced pressure as by means of a conventional blower (not shown).

The shaft 74 has interposed therein a slip joint 81. The arrangement is such that should for any reason the disc 72 bind or be prevented from rotating, the slip joint 81 will operate to permit the shaft section 80 to rotate without rotating the shaft 74 until the obstruction is removed.

This slip joint 81 comprises a sleeve 82' fixed as at 82 to the shaft section 80. Extending from and pinned to the section 80' of the shaft 74 is a stud 83. This stud 83 projects into the sleeve 82 and has formed therein recesses 84 registering with openings 85 formed in the sleeve 82. Positioned in these recesses 84 and projecting through the openings 85 are ball elements 86. Bearing upon these ball elements 86 are springs 87 serving to releasably hold the ball elements in place. A collar 88 is adjusted upon the sleeve over the springs 87, whereby the tension of the springs may be varied according to conditions, as necessary. This collar after adjustment is fixed in place by a set screw 88'.

Should for some reason the shaft section be prevented from rotating, it is clear that the continued rotation of the shaft section 80 will force the ball elements out of their recesses 84 against the action of the springs 87, thus allowing the continued rotation of the shaft section 80 without damage to the parts to be rotated thereby.

The shaft section 80' is connected as shown, to the upper section 81' by a slot and pin connection 89 of standard construction.

It will be noted in reference particularly to Fig. 2 that the ratio between the gears 35 and 42 and 36 and 41 is such that the upper grid plate 14 will rotate at a slower speed than either of the grid plates 15 and 16. This enables the operator to cook or broil the food longer or shorter as the occasion and conditions may require.

The grid plate 13, while being illustrated as stationary, may, like the grid plates 12, be rotatably mounted.

From the description herein, it is apparent that I have provided a cooker which will be highly efficient in use and economical in manufacture and that the several objects of this invention are accomplished by a simple and efficient structure.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

In combination, a cooker having a burner element, a hollow column, a conical shaped collar fixed to said column, a grid plate having a conical shaped hub engageable with said collar and supported by said collar in spaced parallel relation with respect to the burner element, a shaft in the column and having an end portion extending exteriorly thereof, bearing means within said column for stabilizing said shaft, a conical shaped collar mounted on the exterior end of the shaft, a grid plate having a conical shaped hub engageable with said last named collar, driving means, and means connecting the driving means to the column and shaft for rotating the shaft and column simultaneously and at different speeds comprising a gear fixed to said column, a gear fixed to said shaft, and of a smaller gear ratio than that of said first gear, and a pair of interconnected gears of different gear ratios operatively meshing with the said first and second gear.

RICHARD GROETCHEN.

REFERENCES CITED

The following references are of record in the file of this patent:

UNITED STATES PATENTS

| Number | Name | Date |
| --- | --- | --- |
| 109,647 | Moore et al. | Nov. 29, 1870 |
| 275,209 | Heineke | Apr. 3, 1883 |
| 420,891 | Russell | Feb. 4, 1890 |
| 500,839 | Anthony | July 4, 1893 |
| 721,806 | James | Mar. 3, 1903 |

(Other references on following page)

UNITED STATES PATENTS

| Number | Name | Date |
|---|---|---|
| 1,163,807 | Bower et al. | Dec. 14, 1915 |
| 1,351,394 | Martin | Aug. 31, 1920 |
| 1,526,811 | Strauss | Feb. 17, 1925 |
| 1,543,212 | Kurrell et al. | June 23, 1925 |
| 1,599,556 | Cook | Sept. 14, 1926 |
| 1,699,463 | Cresci | Jan. 15, 1929 |
| 1,727,515 | Mendle | Sept. 10, 1929 |
| 1,731,743 | Harrison | Oct. 15, 1929 |
| 1,942,830 | Peebles et al. | Jan. 9, 1934 |
| 2,043,310 | Thompson | June 9, 1936 |
| 2,062,535 | Thompson | Dec. 1, 1936 |
| 2,138,730 | Cooper | Nov. 29, 1938 |
| 2,306,938 | Ebbert | Dec. 29, 1942 |
| 2,330,132 | Martin et al. | Sept. 21, 1943 |
| 2,372,362 | Dawson | Mar. 27, 1945 |

FOREIGN PATENTS

| Number | Country | Date |
|---|---|---|
| 16,608 | Great Britain | 1901 |
| 427,177 | Great Britain | Apr. 15, 1935 |